United States Patent
Sofield (10) Patent No.: US 8,827,341 B2
(45) Date of Patent: Sep. 9, 2014

(54) VEHICLE PORTABLE DEVICE HOLDING SYSTEM

(71) Applicant: Ford Global Technologies, LLC, Dearborn, MI (US)

(72) Inventor: Paul Vincent Sofield, Brisbane (AU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/747,572

(22) Filed: Jan. 23, 2013

(65) Prior Publication Data

US 2014/0203585 A1    Jul. 24, 2014

(51) Int. Cl.
*B60R 7/06*    (2006.01)

(52) U.S. Cl.
CPC ........................................ *B60R 7/06* (2013.01)
USPC ...................................................... 296/37.12

(58) Field of Classification Search
USPC .................... 296/37.12, 192, 193.02, 193.09, 296/203.02, 37.8, 70, 72; 180/90; 248/27.1, 248/309.1; 379/455; 224/483, 929; 280/732, 751, 756, 779
See application file for complete search history.

(56) References Cited

U.S. PATENT DOCUMENTS

| 4,670,988 | A | * | 6/1987 | Baxter | 33/333 |
|---|---|---|---|---|---|
| 5,276,596 | A | * | 1/1994 | Krenzel | 362/191 |
| 5,779,205 | A | * | 7/1998 | Ching | 248/205.8 |
| 5,799,914 | A | * | 9/1998 | Chivallier et al. | 248/176.1 |
| 5,842,481 | A | * | 12/1998 | King | 131/187 |
| 5,988,572 | A | * | 11/1999 | Chivallier et al. | 248/176.1 |
| 6,062,518 | A | * | 5/2000 | Etue | 248/231.21 |
| 6,417,786 | B2 | | 7/2002 | Learman et al. | |
| 6,524,240 | B1 | * | 2/2003 | Thede | 600/300 |
| 6,539,358 | B1 | * | 3/2003 | Coon et al. | 704/275 |
| 6,633,482 | B2 | | 10/2003 | Rode | |
| 7,062,300 | B1 | | 6/2006 | Kim | |
| 7,140,586 | B2 | * | 11/2006 | Seil et al. | 248/311.2 |
| 7,269,002 | B1 | | 9/2007 | Turner et al. | |
| 7,413,155 | B2 | * | 8/2008 | Seil et al. | 248/311.2 |
| 7,873,771 | B2 | | 1/2011 | Krueger et al. | |
| 7,930,004 | B2 | * | 4/2011 | Seil et al. | 455/575.1 |

(Continued)

FOREIGN PATENT DOCUMENTS

| DE | 202011004924 U1 | 10/2011 |
|---|---|---|
| DE | 102010025563 A1 | 12/2011 |

(Continued)

OTHER PUBLICATIONS

"In-Car Mobile Mounting Brackets, Chargers and Ruggedised Technology Cases," ace, Nemesis GB Ltd., 4 pages, dated Jul. 17, 2012.

(Continued)

*Primary Examiner* — Kiran B Patel (74) *Attorney, Agent, or Firm* — Vichit Chea; Price Heneveld LLP (57) ABSTRACT

A vehicle portable device holder is provided which includes a housing defining a storage space for storing an extending member. The extending member is configured to travel between a stored and a use position. A cradle may be attached to the extending member while in the use position so that a portable device may be secured and accessed by passengers inside the vehicle. When no longer being used, the cradle may be removed from the extending member so that the extending member may be properly stowed in the stored position within the housing.

20 Claims, 6 Drawing Sheets

(56) References Cited

U.S. PATENT DOCUMENTS

| | | | |
|---|---|---|---|
| 7,930,006 B2 * | 4/2011 | Neu et al. | 455/575.1 |
| 7,931,505 B2 * | 4/2011 | Howard et al. | 439/680 |
| 7,933,117 B2 | 4/2011 | Howarth et al. | |
| 8,145,821 B2 | 3/2012 | Mead et al. | |
| 8,172,293 B2 | 5/2012 | Lota et al. | |
| 8,183,825 B2 | 5/2012 | Sa | |
| 8,242,906 B2 * | 8/2012 | Fawcett | 340/568.2 |
| 8,325,028 B2 * | 12/2012 | Schofield et al. | 340/438 |
| 8,376,595 B2 * | 2/2013 | Higgins-Luthman | 362/466 |
| 8,393,584 B2 * | 3/2013 | Burns | 248/121 |
| 8,492,698 B2 * | 7/2013 | Schofield et al. | 250/208.1 |
| 8,496,144 B2 * | 7/2013 | Son | 224/276 |
| 2004/0023633 A1 | 2/2004 | Gordon | |
| 2005/0014536 A1 * | 1/2005 | Grady | 455/573 |
| 2005/0045681 A1 * | 3/2005 | Hancock et al. | 224/401 |
| 2006/0052144 A1 * | 3/2006 | Seil et al. | 455/575.1 |
| 2007/0018064 A1 * | 1/2007 | Wang | 248/274.1 |
| 2007/0114974 A1 * | 5/2007 | Grady | 320/137 |
| 2007/0281619 A1 * | 12/2007 | Chen | 455/42 |
| 2008/0019082 A1 * | 1/2008 | Krieger et al. | 361/679 |
| 2009/0275362 A1 | 11/2009 | Tieman et al. | |
| 2010/0078536 A1 * | 4/2010 | Galvin | 248/231.51 |
| 2011/0121148 A1 * | 5/2011 | Pernia | 248/207 |
| 2011/0163211 A1 | 7/2011 | Cicco | |
| 2011/0259789 A1 | 10/2011 | Fan | |
| 2011/0263293 A1 | 10/2011 | Blake et al. | |
| 2012/0018473 A1 | 1/2012 | Da Costa Pito et al. | |
| 2012/0061983 A1 | 3/2012 | Seiller et al. | |
| 2012/0318796 A1 | 12/2012 | Doll | |
| 2013/0043779 A1 | 2/2013 | Fan | |

FOREIGN PATENT DOCUMENTS

| | | |
|---|---|---|
| EP | 2124129 A2 | 11/2009 |
| EP | 2431230 A1 | 3/2012 |
| KR | 100895585 | 4/2009 |
| WO | 2009127439 A2 | 10/2009 |
| WO | 2009143969 A1 | 12/2009 |
| WO | 2010018011 A1 | 2/2010 |
| WO | 2011047984 A2 | 4/2011 |
| WO | 2011060963 A1 | 5/2011 |

OTHER PUBLICATIONS

"Galaxy S III Charting Dock," iBolt.co, http://ibolt.com, 2 pages, Copyrighted 2012 iBolt co.

"Top Cellet Vehicle Dash Phone Holder for Cell Phones & Smartphones," Rocky Case, 2 pages, Copyrighted 2013, www.rockycase.com.

* cited by examiner

FIG. 9

VEHICLE PORTABLE DEVICE HOLDING SYSTEM

FIELD OF THE INVENTION

The present invention generally relates to portable device holders, and more particularly relates to portable device holders adapted to be used within a vehicle.

BACKGROUND OF THE INVENTION

Portable devices are widely used and becoming commonplace in a variety of settings. One particular setting involves the use of such devices inside a traveling vehicle to assist in and enhance a trip experience. Popular devices often include navigation units and assorted media players. In order to communicate with a vehicle's electrical system, devices of this sort are typically plugged into a vehicle's preexisting power supply input such as a cigarette lighter or auxiliary port and are mounted to an interior structure such as an inner windshield or a component located on the dashboard. In some instances, these types of arrangements are not only unsightly, but also result in the presence of loose cables and visual obstructions caused by poor mounting schemes. Consequently, an occupant may be prevented from accessing other vehicle features and devices that may be important or necessary during certain circumstances. For these types of scenarios, it may be desirable to provide a portable device holder that better complements a vehicle's spatial interior without sacrificing occupant safety.

SUMMARY OF THE INVENTION

According to one aspect of the present invention, a vehicle portable device holder is provided. The vehicle portable device holder includes a housing defining a storage space and an extending member configured to move between a stored position within the storage space and a use position extending from the housing. The vehicle portable device holder also includes a cradle for holding a portable device, wherein the cradle may be secured to the extending member when in the use position and removed prior to the extending member returning to the stored position.

According to another aspect of the present invention, a vehicle dashboard assembly is provided. The vehicle dashboard assembly includes a housing defining a storage space and an extending member configured to move between a stored position within the storage space and a use position extending from the housing. The vehicle dashboard assembly also includes a cradle for holding a portable device, wherein the cradle may be secured to the extending member when in the use position and removed prior to the extending member returning to the stored position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
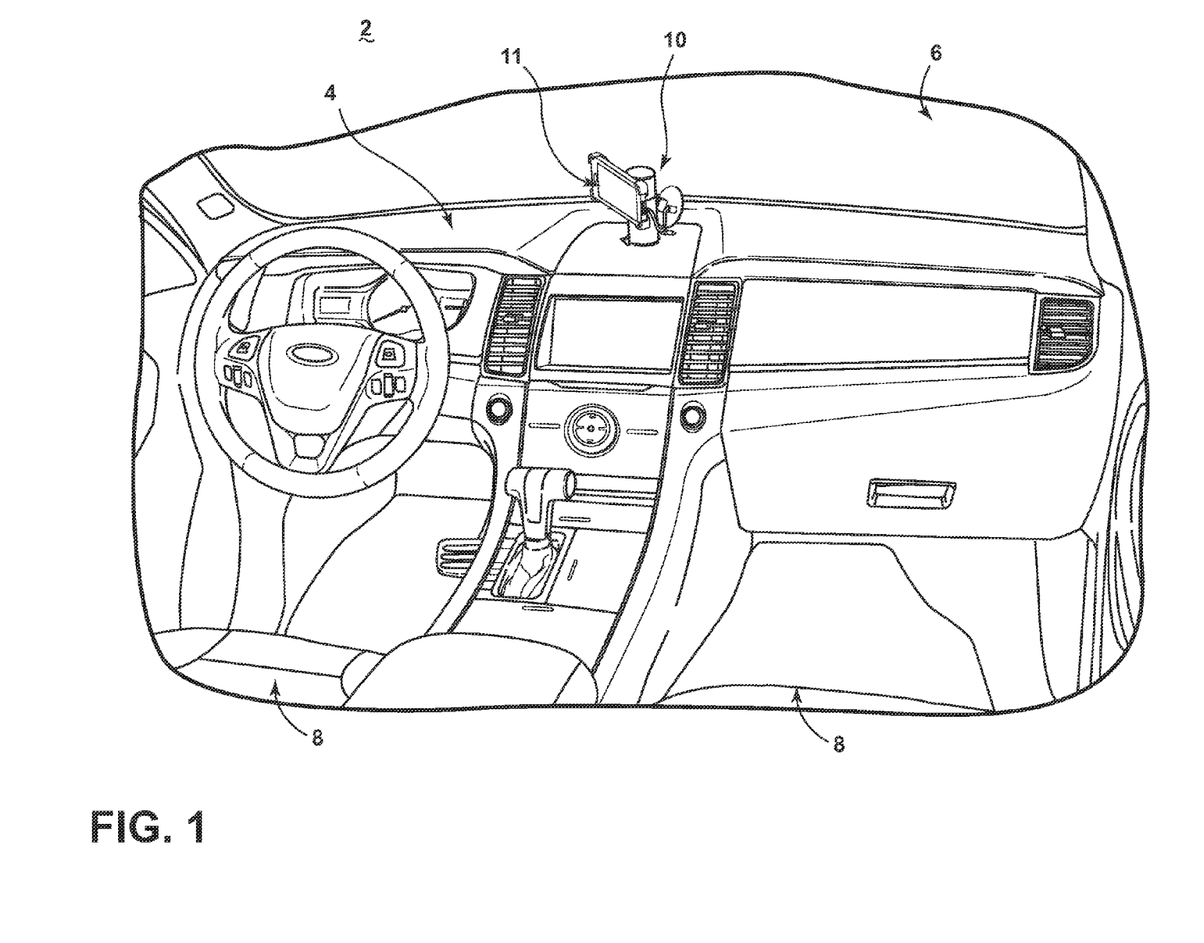
FIG. 1 is a perspective view of a vehicle passenger compartment having a dashboard employing a portable device holder.

Referring now to FIG. 1, the passenger compartment of an automotive vehicle 2 is generally illustrated having a dashboard 4 generally located below the front windshield 6 and in front of the driver and front passenger seats 8. The dashboard 4 may include various components such as one or more instrument and display panels, user input switches, storage compartments, and other vehicle assemblies for occupant use and enjoyment. The dashboard 4 is equipped with a portable device holder 10 generally positioned on the top surface of the dashboard 4 to be accessible by the driver and front passenger. As further illustrated in FIG. 1, a generic portable device 11 is secured by the portable device holder 10 and oriented to face the driver so as to provide easy viewing of the display screen. As will be described in subsequent figures and embodiments, the portable device holder 10 is capable of securing a wide variety of portable devices in numerous viewing orientations and can be adapted to any suitable interior structure of the vehicle.

Figure 2:
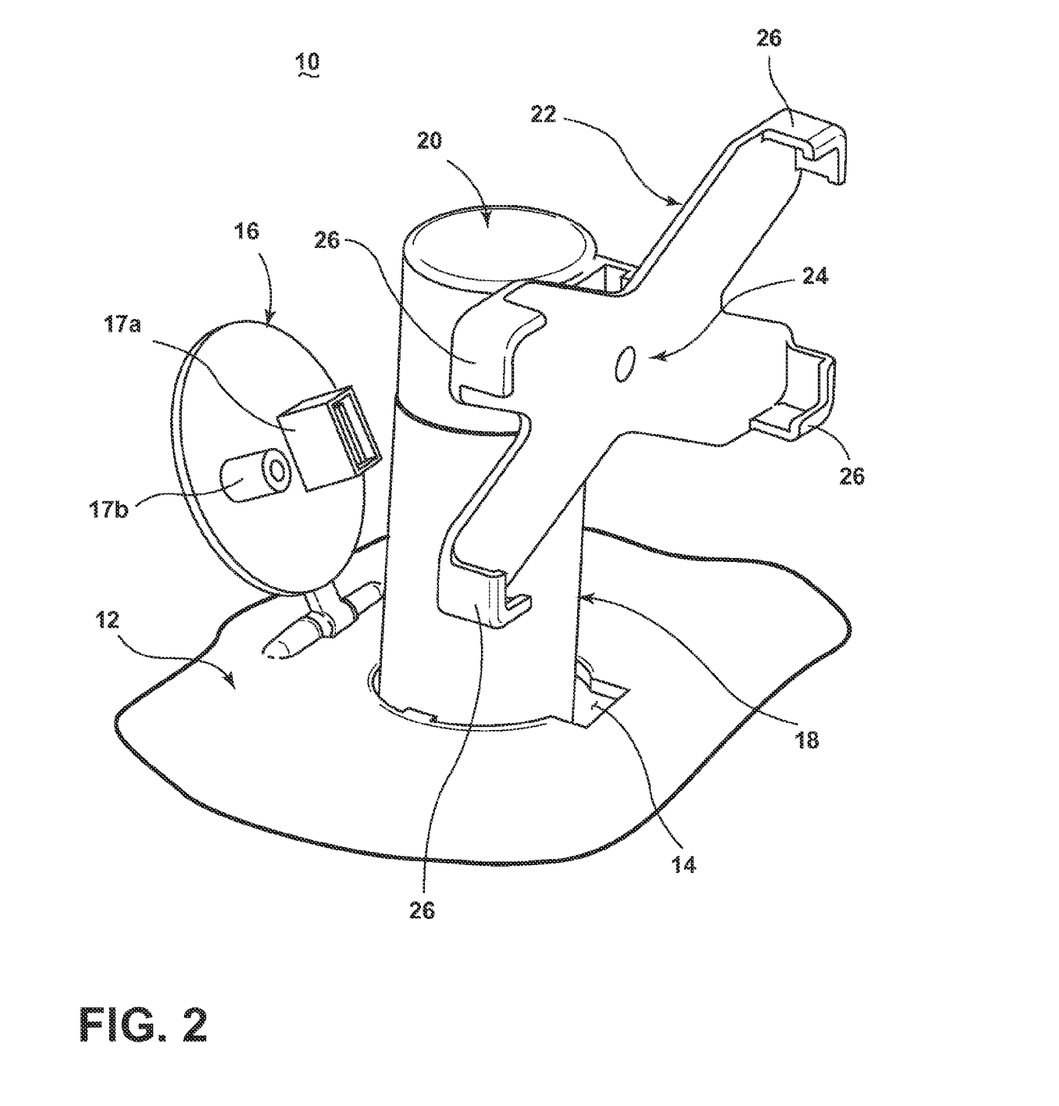
FIG. 2 is perspective side view of the portable device holder showing the portable device holder deployed in the use position for holding a portable device in a widescreen orientation.
Figure 6:
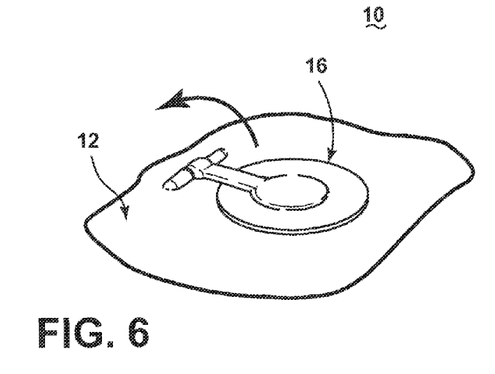
FIG. 6 is a perspective side view of the portable device holder showing the stored position wherein the storage space cover conceals the storage space and its contents.
Figure 7:
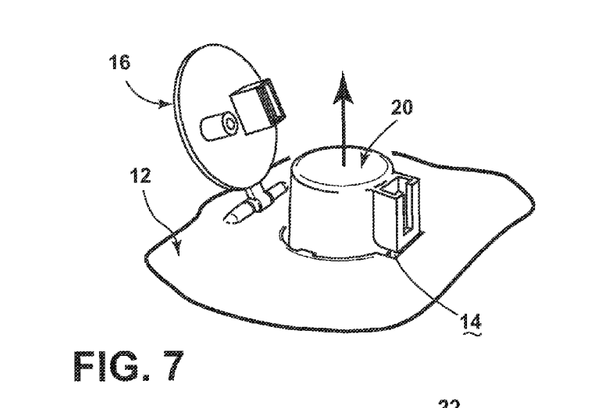
FIG. 7 is a perspective side view of the portable device holder showing the release of the storage space cover to allow for the contents of the storage space to be exposed.
Figure 8:
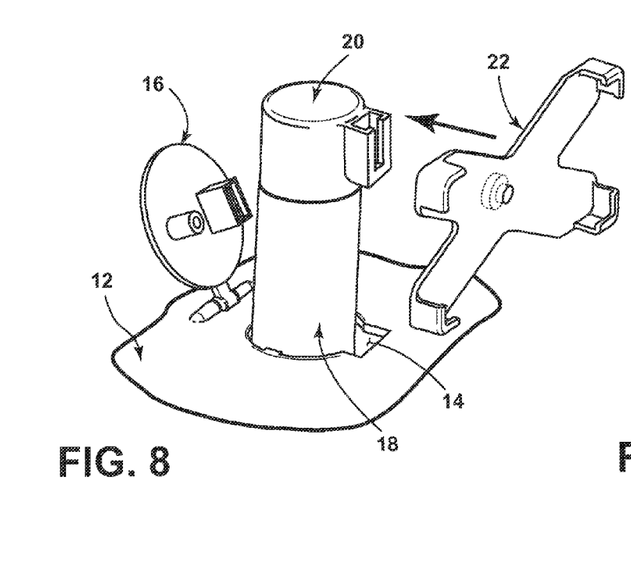
FIG. 8 is a perspective side view of the portable device holder showing one attachment configuration of the cradle to the extending member.
Figure 9:
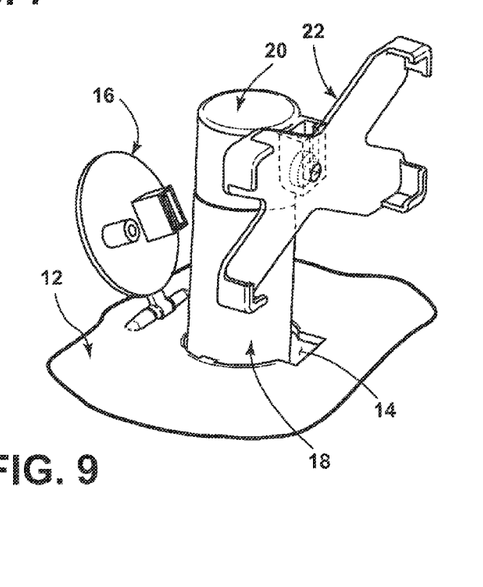
FIG. 9 is a perspective side view of the portable device holder showing the cradle attached to the extending member.

Referring to FIG. 2, one general embodiment of the portable device holder 10 is illustrated and includes a housing 12 that defines a storage space 14 and a storage space cover 16 wherein the storage space cover 16 is arranged to cover the storage space 14 (see FIG. 6) or be released to allow the contents of the storage space 14 to be exposed (see FIG. 7). The storage space 14 is configured to stow an extending member 18 that is capable of moving within the storage space 14 between a stored position and a use position. In FIG. 2, the extending member 18 is shown in the use position, where the storage space cover 16 has been released and the extending member 18 is fully extended upwards relative to the opening of the storage space 14. The extending member 18 further includes an upper portion 20 configured to receive a cradle 22 (see FIG. 8 and FIG. 9) for holding a portable device (not shown). When the portable device is no longer being used, the cradle 22 may be detached from the extending member 18 so that the extending member 18 may be properly returned to the stored position within the storage space 14 and the storage space cover 16 may in turn be closed.

As further illustrated in FIG. 2, the cradle 22 includes a rear support 24 and four outer clips 26 and may be constructed from any suitable material that imparts flexibility and resilience such as polyurethane. In the present embodiment, when a user gently pushes a portable device towards the rear support 24, the corners of the portable device will make contact with and apply outward pressure to the four outer clips 26. The applied pressure will subsequently cause the four outer clips 26 to flex accordingly to accommodate the portable device. Once the device has cleared a determinable distance based on the width of the portable device being held, the pressure against the four outer clips 26 will be alleviated. The four outer clips 26 are then free to return to their original position where they may work in concert to latch onto the portable device to keep it in place.

Conversely, the portable device may be easily removed by gently pulling the portable device away from the rear support 24 causing the outer clips 26 to flex accordingly before releasing the portable device. Given the numerous types of devices in use today, it may be advantageous for the cradle 22 to be able to receive and hold portable devices of various shapes and sizes. One embodiment of the present invention contemplates providing a selection of detachable cradles, where each cradle is fitted to a portable device of a different size and shape. In this manner, a user can easily select and attach the appropriate cradle to the upper portion 20 of the extending member 18 to enable the associated portable device to be held and used. In another embodiment of the present invention, portable devices of different sizes and shapes may be held in place by providing a single detachable cradle that includes an adjustable mechanism capable of collapsing and expanding the cradle. For example, one suitable adjustable mechanism may include a torsion spring and accompanying locking devices such as a locking screw. While a substantially rectangular shaped cradle and portable device were chosen for purposes of illustration in the instant and previously presented embodiments, the present invention also contemplates the existence of devices having non-rectangular shapes. To meet this additional challenge, differently shaped cradles may be employed to properly hold the associated devices in place wherein said cradles may also include clipping structures similar to outer clips 26 disposed in contoured positions relative to the portable device being held.

In addition to portable devices being available in all shapes and sizes, a large number of portable devices have electronic and viewing capabilities as well. As such, additional considerations must be given when holding devices of these types. At present, portable electronic devices generally have a substantially rectangular shape and screen and many electronic devices are capable of displaying different viewing modes depending on the manner in which the device and accompanying screen is oriented. Given a user's preferences, there may be instances favoring one particular orientation over another. As shown in FIG. 2, the cradle 22 is disposed to receive a portable device having a substantially rectangular shape and screen such that the screen is viewable in a landscape or widescreen position. This type of positioning is often the preferred orientation when viewing devices such as navigation units since map details are generally easier to read when viewed in widescreen. In other instances, however, it may be desirable to orient a device's screen in a different position.

Figure 3:
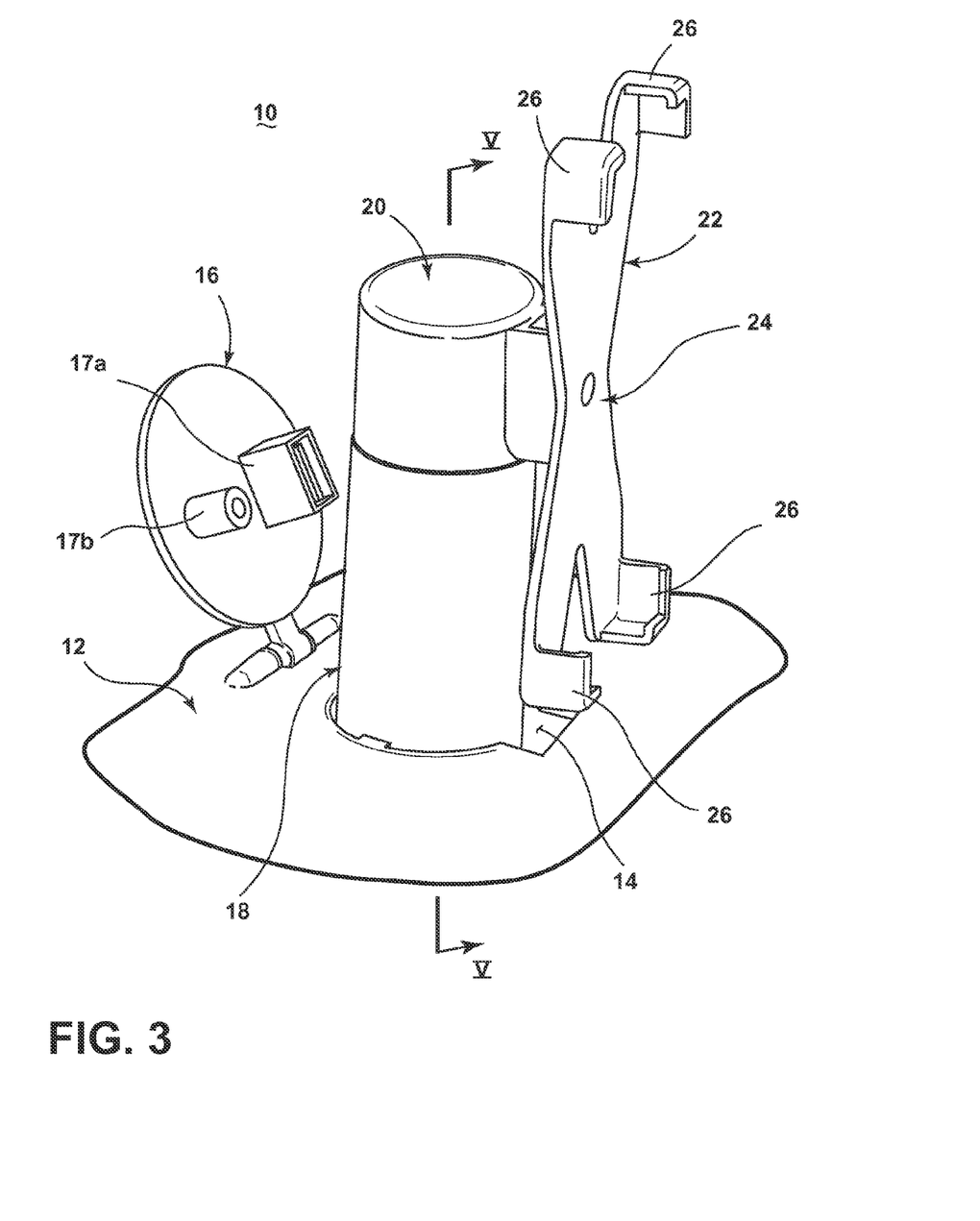
FIG. 3 is a perspective side view of the portable device holder showing the portable device holder deployed in the use position for holding a portable electronic device in an upright portrait-style position.

Referring to FIG. 3, a second general embodiment of the portable device holder 10 is shown wherein the cradle 22 is disposed to receive a portable device having a substantially rectangular shape and screen such that the screen is viewable in an upright portrait-style position. This type of positioning may be preferable when a portable electronic device is being charged or when navigating through a music playlist. While popular, the widescreen and portrait-style orientations are two of many possible orientations that a user may encounter while traveling. With this in mind, it would be advantageous to provide a user with the ability to adjust the orientation in which the portable device is viewed such that the preferred viewing orientation is always available regardless of the dimensions of the cradle 22, the portable device, or the device's accompanying screen.

Figure 4:
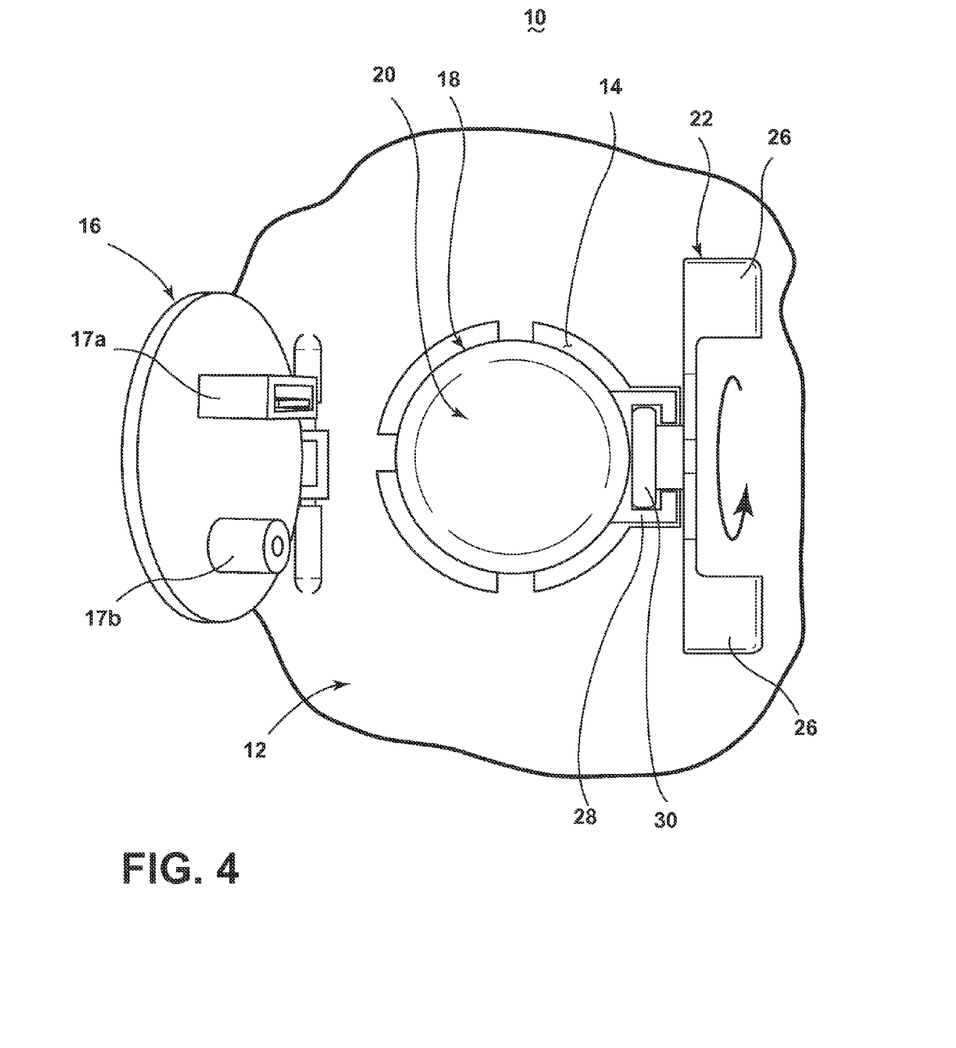
FIG. 4 is a perspective top view of the portable device holder taken through V-V of FIG. 3 showing one configuration in which the cradle may be disposed to fully rotate.

Referring to FIG. 4, a third general embodiment of the portable device holder 10 is shown wherein the cradle 22 can be easily switched between the widescreen and portrait-style orientations. As shown, the upper portion 20 of the extending member 18 includes a slotted receptacle 28 disposed to receive a corresponding holding button 30 located on the rear of the portable device cradle 22. In this embodiment, a user desiring to view a portable device in a particular orientation can simply position the cradle 22 accordingly and insert the holding button 30 into the slotted receptacle 28 to properly secure the cradle 22. Should the user desire another orientation at a later time, the user can remove and reposition the cradle 22 before inserting the holding button 30 into the slotted receptacle 28 to secure the device cradle 22 in the new desired position.

In some instances, however, constant repositioning of the cradle 22 may be bothersome to the user. As such, it may be advantageous to enable a user to quickly change the angular positioning of the cradle 22 without having to detach and reposition the cradle 22. In the instant embodiment, the holding button 30 may be rotatably coupled to the cradle 22 wherein a holding force between the holding button 30 and the cradle 22 prevents the cradle 22 from turning independently. When user intervention is detected, the cradle 22 may rotate freely or incrementally about the horizontal axis when the user provides the necessary turning force to overcome the holding forces present between the holding button 30 and the cradle 22. Once the cradle 22 reaches the desired position, the user may cease application of force and the holding forces present between the cradle 22 and the holding button 30 may in turn prevent any unwanted movement of the cradle 22, thereby holding the portable device in the current desired position. Any suitable fastener connecting the holding button 30 to the cradle 22 may be used to achieve a holding force. For example, a locking screw assembly may be employed for creating a smooth turning motion or a locking gear assembly may be employed for creating an incremental turning motion.

Figure 5:
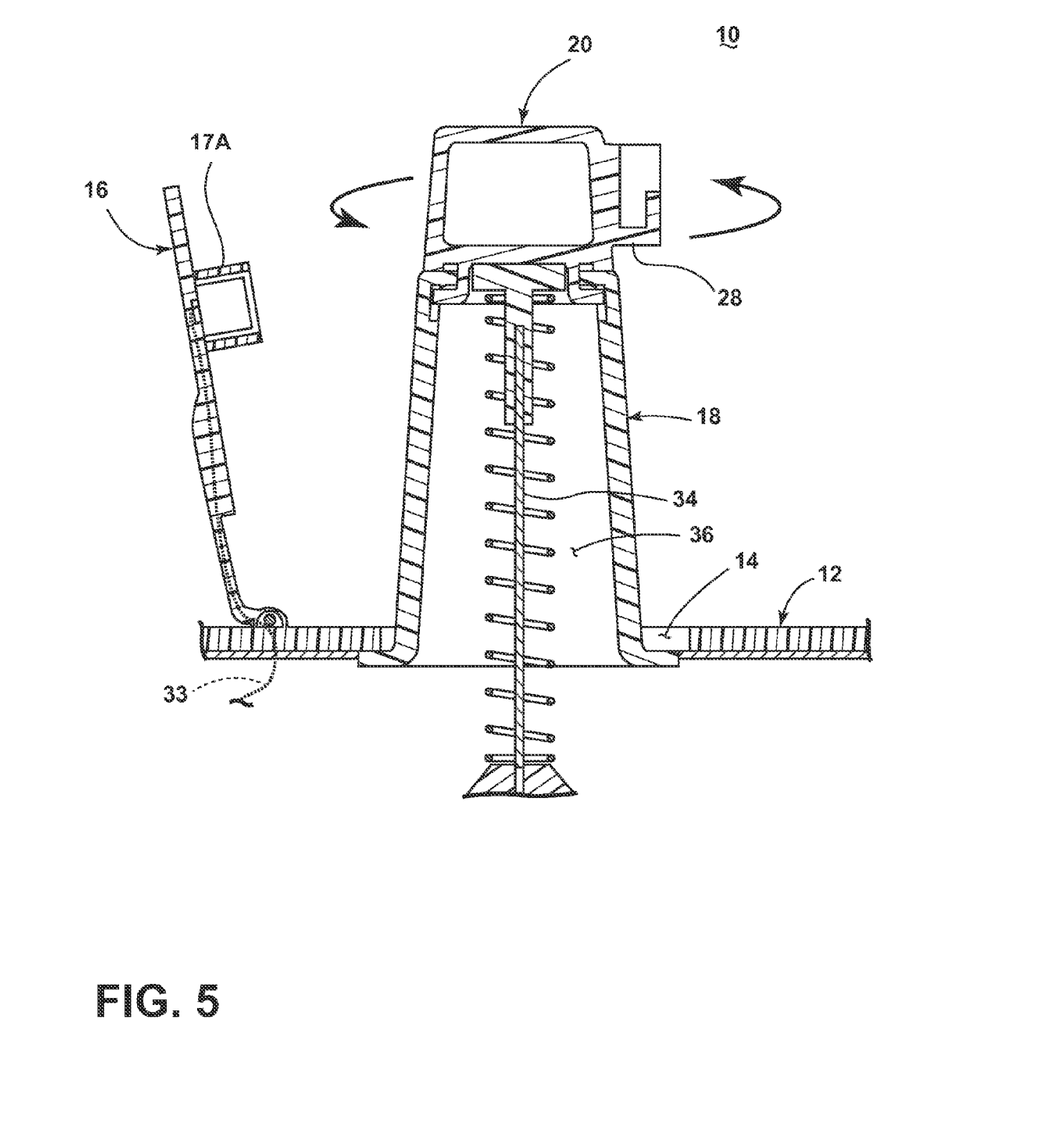
FIG. 5 is a cross-sectional side view of the portable device holder showing additional features and providing one means for moving the extending member between the stored and use positions.

Referring now to FIG. 5, a fourth general embodiment of the portable device holder 10 is shown to further present features of the portable device holder 10 in addition to one embodiment in which the extending member 18 may travel between the stored and use positions. One such feature imparts rotating capabilities to the extending member 18 so that a portable device can be accessed and viewed by different passengers in the vehicle by rotating the extending member about the vertical axis to a position such that the portable electronic device screen faces an intended user's line of vision.

In the instant embodiment, the upper portion 20 is rotatably coupled to the extending member 18, wherein a holding force between the upper portion 20 of the extending member 18 and the lower portion of the extending member 18 prevents the upper portion 20 from rotating independent of any user intervention. Any suitable fastener connecting the upper portion 20 of the extending member 18 to the lower portion of the extending member 18 may be used to achieve a holding force. For example, a locking screw assembly may be employed for creating a smooth turning motion or a locking gear assembly may be employed for creating an incremental turning motion.

As shown in FIG. 5, the upper portion 20 additionally includes a bottom annular insert 31 configured to be received by an annular groove 32 located in the upper interior of the extending member 18. In operation, a user may then rotate the upper portion 20 to a desired position by providing enough turning force to overcome the holding forces present between the upper portion 22 and the lower portion of the extending member 18. Once the upper portion 20 reaches the desired position, the user may cease application of force and the holding forces present between the upper portion 20 and the lower portion of the extending member 18 may in turn prevent any subsequent undesired movement of the upper portion 20, thereby keeping the upper portion 20 in the current desired position. From here, adjustments can be made on the cradle orientation if needed.

Another feature provided by the instant embodiment is enabled communication between a portable electronic device and a vehicle's electrical system to accomplish a wide variety of actions. As shown in FIG. 5, the storage space cover 16 may include one or more electrical ports such as a USB port 17a to accommodate additional user inputted devices or bolster the capabilities of devices already in use. In the instant embodiment, the USB port 17a makes a wired connection with the vehicle's electrical system, wherein a wire 33 connecting the USB port 17a to the electrical system is contained and fed through the storage space cover 16. Referring back to FIG. 2, the storage space cover 16 is shown to further include a USB port 17a and an auxiliary port 17b. Since many popular portable electronic devices make wired connections with these available ports, added functional versatility can be achieved when wireless communication is not available or undesired. For instance, a user may plug a USB drive into the USB port 17a to play stored music through the vehicle's sound system or the USB port 17a may be used to provide power to a navigation unit or charge a cellular phone that is secured in the portable device cradle 22 or left free standing. Likewise, the auxiliary port 17b may similarly be used to enable other portable electronic devices having different wire connections to communicate through the vehicle's electrical system. These, along with other suitable types of electrical ports will become apparent to those skilled in the art and may be used accordingly.

Also shown in FIG. 5 is one embodiment for moving the extending member 18 between the stored and use positions. In the instant embodiment, a spring 34 is disposed longitudinally inside a space 36 within the extending member 18 and is configured to move between the stored and use positions by compressing and extending, respectively. When in the stored position, the extending member 18 is secured inside the storage space 14 at a distance that would not hinder the closing of the storage space cover 16 or encumber any electrical ports contained thereon. As a result of the extending member 18 traveling to the stored position, the spring 34 will be compressed some distance. Naturally, the spring 34 will desire to return to an uncompressed state thereby requiring a locking mechanism to prevent unwanted decompression. To counteract this behavior, a push-open spring latch may be employed such that when the spring 34 has compressed to the stored position, a user may push down upon the upper portion 20 a first time to engage, thereby holding the spring 34 and extending member 18 in the stored position. At a later time, the user may push down upon the upper portion 20 a second time to unlatch the lock to allow for the spring 34 to extend and deploy the extending member 18 towards the use position. When the extending member 18 reaches the use position, similar locking means as the above described may be employed to lock and release the extending member 18 to and from the use position. With regards to bi-directional travel of the spring 34, the rate of compression and extension of the spring 34 may be controlled by choosing a spring 34 having acceptable tensile strength. Additionally, a damper device may be employed to ensure a smooth deployment of the extending member 20.

Accordingly, the vehicle portable device holder described advantageously holds a portable device for convenient viewing and use within a vehicle. The system is stowable and readily deployable to accommodate the positioning of various portable devices. It is to be understood that variations and modifications can be made on the aforementioned structures without departing from the concepts of the present invention, and further it is to be understood that such concepts are intended to be covered by the following claims unless these claims by their language expressly state otherwise.

What is claimed is:

1. A vehicle portable device holding system comprising:
    a housing defining a storage space;
    an extending member movable between a stored position within the storage space and a use position extending from the housing; and
    a cradle for holding a portable device and removably engaged to the extending member, wherein the cradle is engaged to the extending member when in the use position and removed prior to the extending member returning to the stored position.

2. The portable device holding system as defined in claim 1, wherein the extending member comprises a rotatable upper portion that includes a first connecting member and the cradle comprises a second connecting member removably coupled to the first connecting member, further wherein the first and second connecting members are operably coupled to provide rotational movement of the cradle.

3. The portable device holding system as defined in claim 1, wherein a lockable spring mechanism moves the extending member between the stored and use positions.

4. The portable device holding system as defined in claim 1, wherein the housing is provided in a vehicle dashboard such that the extending member extends from the housing into a vehicle passenger compartment.

5. The portable device holding system as defined in claim 1, further comprising a releasable storage space cover coupled to the housing, wherein the releasable storage space cover substantially conceals the extending member in the stored position and is released prior to the extending member moving to the use position.

6. The portable device holding system as defined in claim 5, wherein the storage space cover comprises at least one electrical port in communication with a vehicle electrical system.

7. The portable device holding system as defined in claim 6, wherein the at least one electrical port comprises one of a USB port and an auxiliary port.

8. A vehicle portable device holding system comprising:
    a dashboard defining a storage space;

an extending member movable between a stored position within the storage space and a use position extending from the dashboard; and a cradle for holding a portable device and removably engaged to the extending member, wherein the cradle is engaged to the extending member when in the use position and removed prior to the extending member returning to the stored position.

9. The vehicle portable device holding system as defined in claim 8, wherein the extending member comprises a rotatable upper portion that includes a first connecting member and the cradle comprises a second connecting member removably coupled to the first connecting member wherein the first and second connecting members are operably coupled to provide rotational movement of the cradle.

10. The vehicle portable device holding system as defined in claim 8, wherein a lockable spring mechanism moves the extending member between the stored and use position.

11. The vehicle portable device holding system as defined in claim 8, wherein the extending member extends from the dashboard into a vehicle passenger compartment.

12. The vehicle portable device holding system as defined in claim 8, further comprising a releasable storage space cover coupled to the dashboard, wherein the releasable storage space cover substantially conceals the extending member in the stored position and does not obstruct the extending member from moving to the use position.

13. The vehicle portable device holding system as defined in claim 12, wherein the storage space cover comprises at last one electrical port in communication with a vehicle electrical system.

14. The vehicle portable device holding system as defined in claim 13, wherein the at least one electrical port comprises one of a USB port and an auxiliary port.

15. A vehicle portable device holding system comprising:
a housing defining a storage space;
an extending member movable between a stored position within the storage space and a use position extending from the housing;
a cradle for holding a portable device and removably engaged to the extending member, wherein the cradle is engaged to the extending member when in the use position and removed prior to the extending member returning to the stored position; and
a storage space cover coupled to a surface of the housing and movable between a first position that substantially conceals the extending member while in the stored position and a second position that allows the extending member to move to the use position.

16. The portable device holding system as defined in claim 15, wherein the extending member comprises a rotatable upper portion that includes a first connecting member and the cradle comprises a second connecting member removably coupled to the first connecting member, further wherein the first and second connecting members are operably coupled to provide rotational movement of the cradle.

17. The portable device holding system as defined in claim 15, wherein a lockable spring mechanism moves the extending member between the stored and use positions.

18. The portable device holding system as defined in claim 15, wherein the housing is provided in a vehicle dashboard such that the extending member extends from the dashboard into a vehicle passenger compartment.

19. The portable device holding system as defined in claim 15, wherein the cradle is configured to be removably engaged to a peripheral region of the portable device.

20. The portable device holding system as defined in claim 15, wherein the storage space cover comprises at least one electrical port in communication with a vehicle electrical system, further wherein the at least one electrical port comprises one of a USB port and an auxiliary port.

* * * * *